United States Patent
Croak et al.

(10) Patent No.: US 7,734,022 B1
(45) Date of Patent: Jun. 8, 2010

(54) METHOD AND APPARATUS FOR MANAGING CALL REQUESTS IN A COMMUNICATION NETWORK

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 1431 days.

(21) Appl. No.: 11/003,747

(22) Filed: Dec. 3, 2004

(51) Int. Cl.
   *H04M 1/64* (2006.01)

(52) U.S. Cl. ............... 379/88.19; 370/354; 370/356; 370/392; 379/88.17; 379/88.23; 379/102.04; 379/142.02; 379/198; 455/461

(58) Field of Classification Search ......... 370/356, 370/354, 392; 379/88.17, 88.19, 88.23, 102.04, 379/142.02, 198; 455/461
   See application file for complete search history.

(56) References Cited

U.S. PATENT DOCUMENTS

| | | | | |
|---|---|---|---|---|
| 4,661,974 A | * | 4/1987 | Bales et al. ............... | 379/198 |
| 5,604,792 A | * | 2/1997 | Solomon et al. ......... | 379/88.23 |
| 5,809,114 A | * | 9/1998 | Solomon et al. ......... | 379/88.19 |
| 6,175,622 B1 | * | 1/2001 | Chiniwala et al. ...... | 379/221.09 |
| 6,353,660 B1 | * | 3/2002 | Burger et al. ............ | 379/88.17 |
| 6,404,860 B1 | * | 6/2002 | Casellini .................. | 379/88.17 |
| 6,574,328 B1 | * | 6/2003 | Wood et al. ................ | 379/224 |
| 6,611,689 B1 | * | 8/2003 | Cartigny et al. ............ | 455/461 |
| 6,785,379 B1 | * | 8/2004 | Rogers et al. .......... | 379/265.02 |
| 6,798,772 B2 | * | 9/2004 | Bergman et al. ............ | 370/354 |
| 6,993,118 B2 | * | 1/2006 | Antonucci et al. ............ | 379/45 |
| 7,072,341 B2 | * | 7/2006 | Xu et al. ..................... | 370/392 |
| 7,106,850 B2 | * | 9/2006 | Campbell et al. ....... | 379/265.09 |
| 7,324,635 B2 | * | 1/2008 | Wood et al. ............ | 379/142.02 |
| 7,522,717 B2 | * | 4/2009 | Croak et al. ........... | 379/102.04 |
| 7,587,036 B2 | * | 9/2009 | Wood et al. ............ | 379/142.02 |

* cited by examiner

*Primary Examiner*—Gerald Gauthier

(57) ABSTRACT

Method and apparatus for managing call requests in a communication network is described. In one example, a call request for a public identifier associated with a recipient party is received from an originating device. A set of approved calling party identifiers associated with the public identifier is identified. A calling party identifier associated with the originating device is compared with the set of approved calling party identifiers. If the calling party is approved, then: a private identifier for a recipient device is selected based on the calling party identifier, and the call request is routed to the recipient device using the private identifier. If the calling party is not approved, then: a call handling treatment associated with the public identifier may be identified, and the call request may be handled in accordance with the calling handling treatment.

20 Claims, 4 Drawing Sheets

US 7,734,022 B1

METHOD AND APPARATUS FOR MANAGING CALL REQUESTS IN A COMMUNICATION NETWORK

BACKGROUND OF THE INVENTION

1. Field of the Invention

Embodiments of the present invention generally relate to telecommunications systems and, more particularly, to a method and apparatus for managing call requests in a communication network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet-switched networks and circuit-switched networks. Exemplary packet-switched networks include internet protocol (IP) networks, asynchronous transfer mode (ATM) networks, frame-relay networks, and the like. One type of packet-switched communication network is a voice-over-internet protocol (VOIP) network. An exemplary circuit-switched network includes a plain old telephone system (POTS), such as the publicly switched telephone network (PSTN).

Notably, some users of a telecommunication system may have multiple phone numbers associated with various devices. For example, a user may have a telephone number associated with a time division multiplexing (TDM) phone, another telephone number associated with an internet protocol (IP) phone, and yet another telephone number associated with a cellular telephone. Users may desire to keep some telephone numbers private, yet still be able to receive calls from an approved set of calling parties. Users may further desired to specify specific call handling treatments for calling parties that are not approved.

SUMMARY OF THE INVENTION

One aspect of the invention relates to a method and apparatus for processing a call request in a communication network. A call request for a public identifier associated with a recipient party is received from an originating device. A set of approved calling party identifiers associated with the public identifier is identified. A calling party identifier associated with the originating device is compared with the set of approved calling party identifiers. In response to the calling party identifier being included in the set of approved calling party identifiers: a private identifier for a recipient device is selected based on the calling party identifier, and the call request is routed to the recipient device using the private identifier. In one embodiment, routing instructions associated with the public identifier are processed using the calling party identifier as parametric input to select the private identifier and associated recipient device. In response to the calling party identifier being excluded from the set of approved calling party identifiers: a call handling treatment associated with the public identifier may be identified, and the call request may be handled in accordance with the calling handling treatment. For example, the call request may be forwarded to a voice message service or some other surrogate device.

Another aspect of the invention relates to a method and apparatus for managing call requests in a communication network. A public identifier associated with a recipient party is registered with the communication network. A set of approved calling party identifiers associated with the public identifier is registered. Routing instructions are registered. The routing instructions include information for routing call requests from each approved calling party identifier in the set to at least one private identifier associated with a respective at least one recipient device. Call requests are processed from the public identifier in accordance with the set of approved calling party identifiers and the routing instructions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
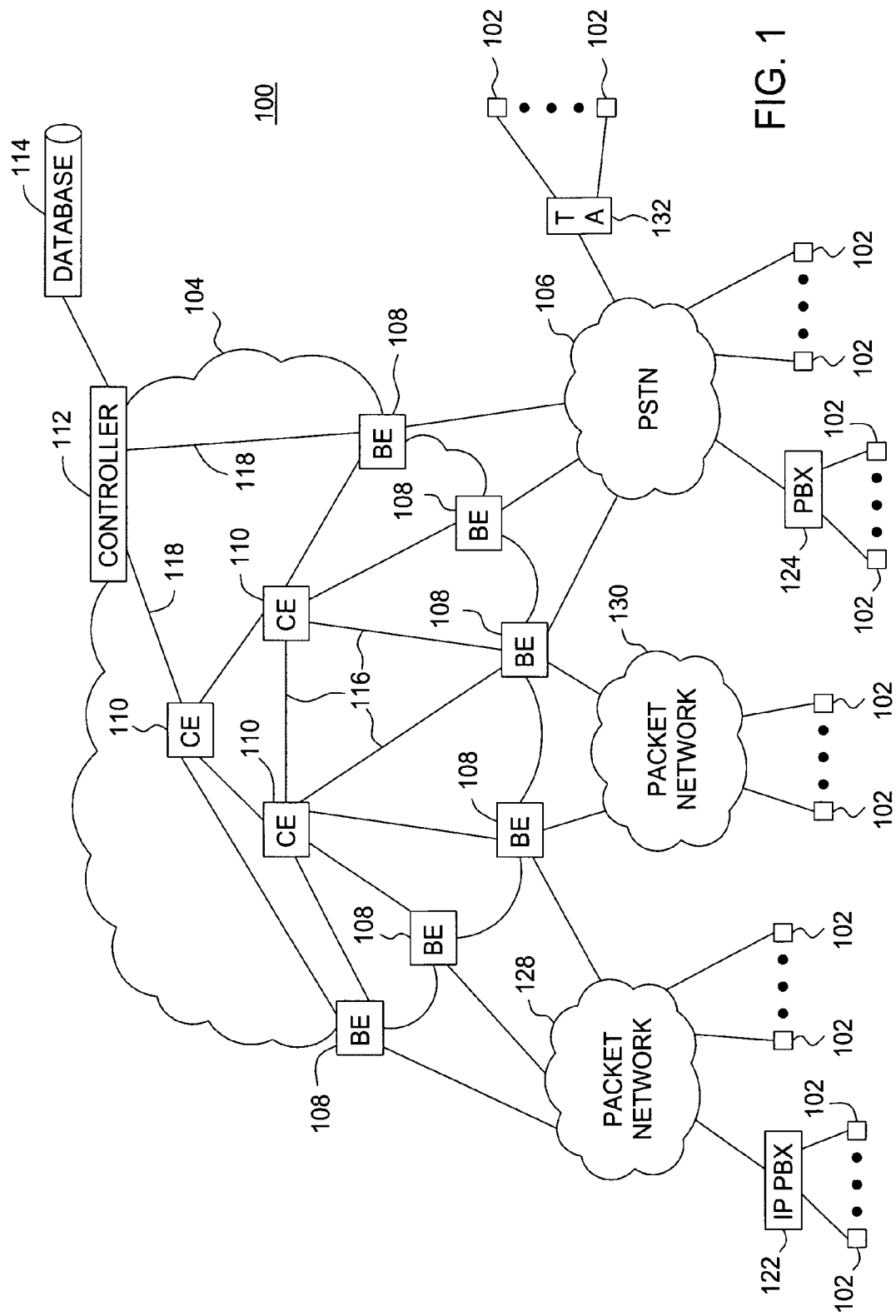
FIG. 1 is a block diagram depicting an exemplary embodiment of a communication system in accordance with the invention.

FIG. 1 depicts an exemplary embodiment of a communication system 100 in accordance with the invention. The communication system 100 comprises a plurality of endpoint devices 102 configured for communication among one another through a packet-switched network 104. The packet-switched network 104 illustratively comprises a plurality of border elements (BEs) 108, a plurality of core elements (CEs) 110, a controller 112, and a database 114. The border elements 106 and the core elements 108 communicate via core communication links 116. The controller 112 may be coupled to one or more of the core elements 110 or border elements 108 through communication link(s) 118. The packet-switched network 104 may comprise one or more of an internet protocol (IP) network, asynchronous transfer mode (ATM) network, frame relay network, and like type packet networks known in the art. For example, the packet-switched network 104 may comprise a voice-over-IP (VOIP) network. A VOIP network is a network over which calls are made among endpoints using packetized communication channels.

A core element is a network element (such as a router, switch, cross-connect system, server, and the like) that facilitates control and communication between the border elements 106. A border element is a network element (such as a router, switch, cross-connect system, server, and the like) through which the user elements 102 connect to the packet-switched network 104. A border element typically performs functions such as routing, switching, security, admission control, and the like. In one embodiment, a border element translates access protocols into Session Initiation Protocol (SIP), which is then used to facilitate communication within a service provider IP infrastructure. A border element comprises an "edge component" of the packet-switched network 104.

Those skilled in the art will appreciated that the packet-switched network 104 may include other types of edge components, such as trunk groups, firewalls, and the like.

For purposes of clarity by example, only three core elements 110 are depicted in FIG. 1. It is to be understood that the packet-switched network 104 may include fewer or more core elements 110. Similarly, although six border elements 108 are depicted in FIG. 1 by example, the packet-switched network 104 may include fewer or more border elements. Although the border elements 108 are depicted as being directly connected to the core elements 110, other intervening equipment (not shown) may be deployed.

An endpoint device is typically a user terminal (such as a telephone, computer, and the like) by which one or more users communicate with other users in the communication system 100. Some of the endpoint devices 102 communicate with one or more of the border elements 108 via a packet network (e.g., packet network 128 and packet network 130). Others of the endpoint devices 102 communicate with one or more of the border elements 108 via a circuit-switched network, such as publicly switched telephone network (PSTN) 106. The details of the PSTN 106 are well known in the art and are thus not repeated herein for clarity. Exemplary endpoint devices include a time division multiplexing (TDM) phone, an IP phone, an Integrated Services Digital Network (ISDN) phone, a computer, and the like.

In one embodiment, an endpoint device connects to the packet-switched network 104 through a circuit-switched connection with a border element. In another embodiment, an endpoint device connects to the network 104 through an IP connection with a border element. In other embodiments, an endpoint may connect to a border element via a Signaling System 7 (SS7) connection, a Digital Subscriber Line (DSL) connection, a cable television connection, a customer managed router connection, a customer managed gateway connection, a local area network connection, a frame relay (FR) connection, an asynchronous transfer mode (ATM) connection, and like access technologies as known in the art. Those skilled in the art will appreciate that numerous other techniques for establishing a connection between a user element and a border element exist in the art.

Some of the endpoint devices 102 (e.g., TDM phones) connect to the PSTN 106 via a TDM Private Branch Exchange (PBX) 124 or connect to the PSTN 106 directly. Others of the endpoint devices 102 (e.g., an IP phone) connect to the packet network 128 via an IP Private Branch Exchange (IP-PBX) 122 or connect to the packet networks 128 and 130 directly (e.g., computer). Still others of the endpoint devices 102 (e.g., ISDN phone) connect to the PSTN 106 via a terminal adapter (TA) 132.

In accordance with the invention, a user registers a public identifier with the controller 112 for one or more endpoint devices. Each of the user's endpoint devices includes a private number with which the packet-switched network 104 uses to forward call requests thereto. The private numbers of the user's endpoint devices are secured by the packet-switched network 104 and are publicly unavailable. Only the public identifier for the endpoint devices is publicly available. For example, the public and private identifiers may comprise telephone numbers.

The user further registers a set of approved calling party identifiers associated with the public identifier, as well as routing instructions, with the controller 112. The routing instructions include information for routing call requests from each approved calling party identifier to at least one private identifier associated with a respective at least one user endpoint device. For example, a set of approved calling party identifiers may include a user's mother, a user's sister, and a user's co-worker. Routing instructions may be established to route call requests from the user's mother and sister to the private identifier of the endpoint device in the user's home. Routing instructions may be established to route call requests from the user's co-worker to the private identifier of the user's mobile endpoint device (e.g., cellular telephone). The user may also register a call handling treatment for all calling party identifiers that are not approved with the controller 112.

In this manner, the controller 112 may store public identifiers for users of the packet-switched network 104 in the database 114. The controller 112 also stores the approved calling party set and routing instructions for each public identifier in the database 114. Any information with respect to private identifiers in the database 114 is kept secure and publicly unavailable. Call requests are made to a recipient party using that party's public identifier. For a given call request, the controller 112 identifies the set of approved calling party identifiers associated with the public identifier. If the calling party identifier associated with the call request is included in the approved list, the controller 112 processes the routing instructions using the calling party identifier as parametric input to select a private identifier for a recipient device. The controller 112 then routes the call request to the recipient device using the private identifier. If the calling party identifier associated with the call request is not in the approved list, the controller 112 identifies a call handling treatment associated with the public identifier. The controller 112 handles the call request in accordance with the call handling treatment. For example, call requests from unapproved calling parties may be forwarded to a voicemail service or to a surrogate device (e.g., an endpoint device of an assistant).

For purposes of clarity by example, only a single controller/database pair is shown. It is to be understood, however, that multiple controllers and multiple databases may be employed, where each database may be configured to communicate with one or more controllers, and each controller may be configured to communicate with one or more databases.

Figure 2:
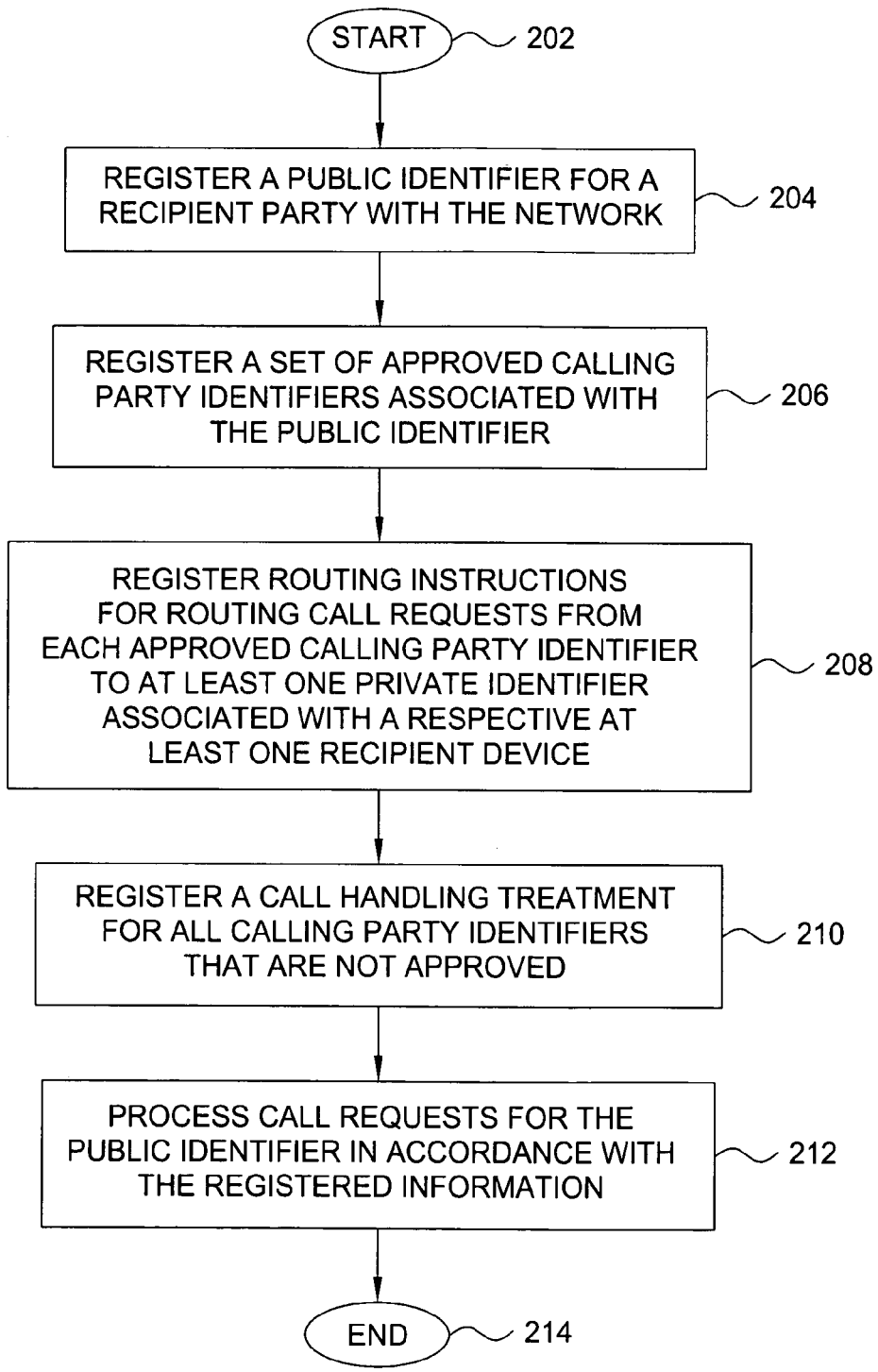
FIG. 2 is a flow diagram depicting an exemplary embodiment of a method for managing call requests in a communication network in accordance with the invention.

FIG. 2 is a flow diagram depicting an exemplary embodiment of a method 200 for managing call requests in a communication network in accordance with the invention. The method begins at step 202. At step 204, a public identifier for a recipient party is registered with the network. At step 206, a set of approved calling party identifiers associated with the public identifier is registered. At step 208, routing instructions associated with the public identifier are registered. The routing instructions include information for routing call requests from each approved calling party identifier to at least one private identifier associated with a respective at least one recipient device. At step 210, a call handling treatment is registered for all calling party identifiers that are not approved at step 206. At step 212, call requests for the public identifier are processed in accordance with the registered information. An exemplary method for processing call requests is described below with respect to FIG. 3. The method 200 ends at step 214. The method 200 may be repeated for various users of the packet-switched communication network.

Figure 3:
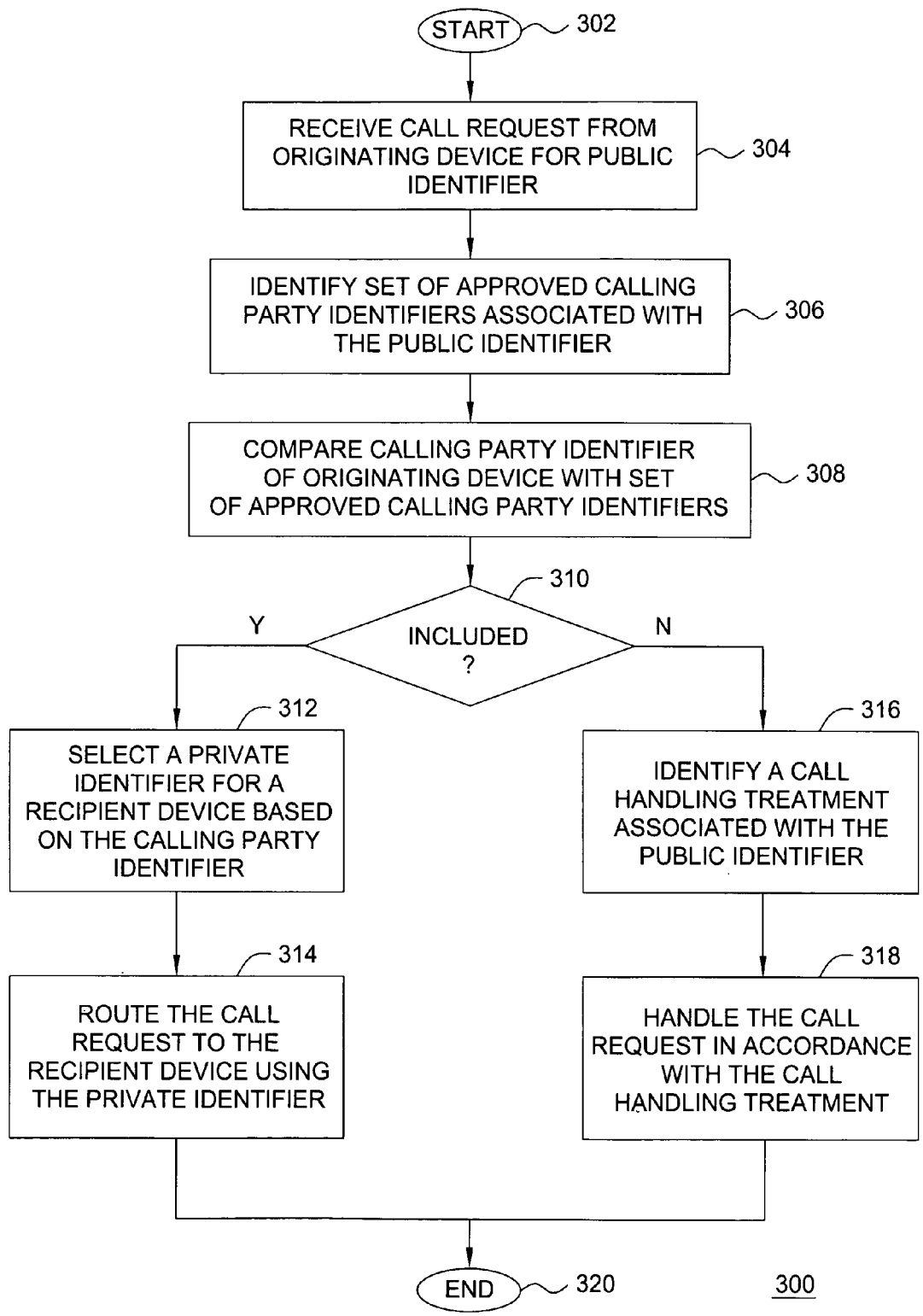
FIG. 3 is a flow diagram depicting an exemplary embodiment of a method for processing a call request in a communication network in accordance with the invention.

FIG. 3 is a flow diagram depicting an exemplary embodiment of a method 300 for processing a call request in a communication network in accordance with the invention. The method 300 may be performed for each call request processed at step 212 of the method 200 of FIG. 2. The method 300 begins at step 302. At step 304, a call request is received from an originating device for a public identifier. At step 306, a set of approved calling party identifiers associated with the public identifier is identified. At step 308, the calling party identifier of the originating device is compared with the set of approved calling party identifiers. At step 310, a determination is made as to whether the calling party identifier is included in the set of approved calling party identifiers. If so, the method 300 proceeds to step 312.

At step 312, a private identifier for a recipient device is selected based on the calling party identifier. For example, routing instructions associated with the public identifier may be processed using the calling party identifier as parametric input to select the private identifier for the recipient device. At step 314, the call request is routed to the recipient device using the private identifier selected at step 312.

If, at step 310, the calling party identifier is not included in the set of approved calling party identifiers, the method 300 proceeds to step 316. At step 316, a call handling treatment associated with the public identifier is identified. At step 318, the call request is handled in accordance with the identified call handling treatment. For example, a call handling treatment may be associated with a voice message service. If a call request is from an unapproved calling party, then the call request is routed to the voice message service. In another example, the call handling treatment may be associated with a surrogate device (e.g., an endpoint device of an assistant to the user or an answering service for the user). If a call request is from an unapproved calling party, then the call request is routed to the surrogate device. The method 300 ends at step 320.

Figure 4:
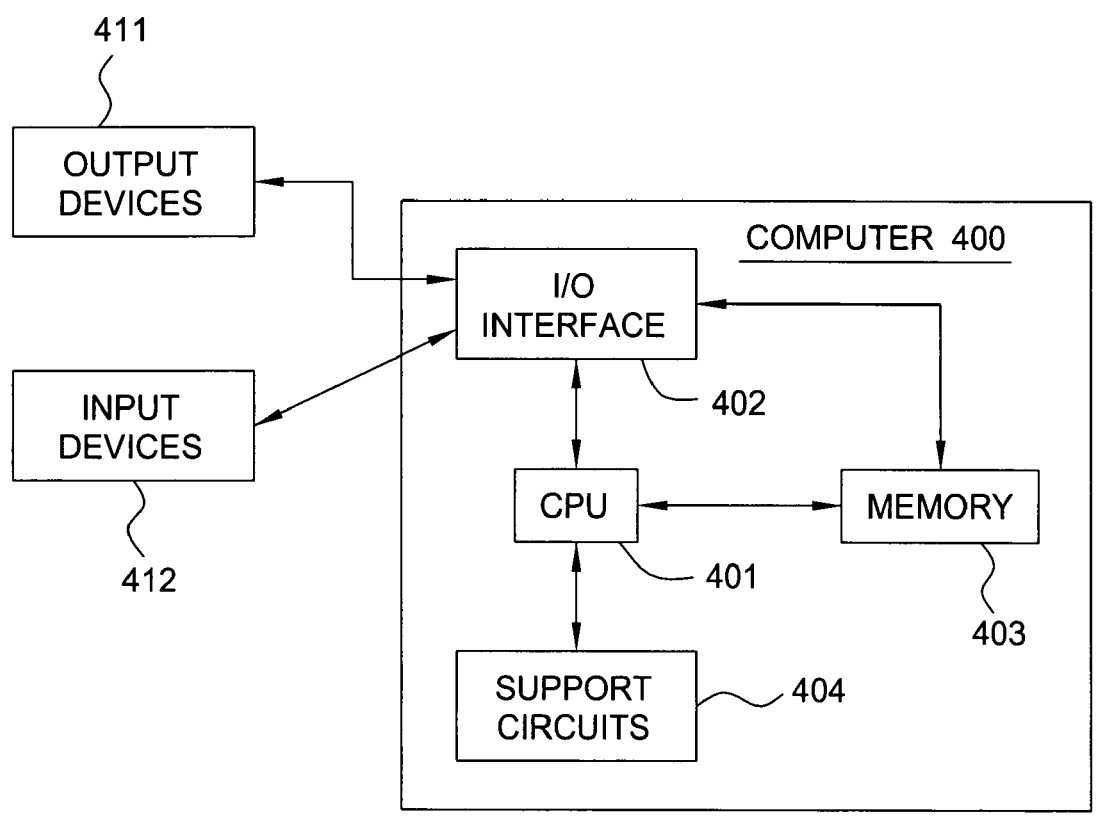
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. For example, the computer 400 may be used to implement the controller 112, border elements 108, and core elements 110 of FIG. 1. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of processing a call request in a communication network, comprising:
   receiving, from an originating device, a call request for a public identifier associated with a recipient party;
   identifying, by said communication network operated by a service provider, a set of approved calling party identifiers associated with said public identifier;
   comparing a calling party identifier associated with said originating device with said set of approved calling party identifiers; and
   if said calling party identifier is included in said set of approved calling party identifiers:
      selecting a private identifier for a recipient device based on said calling party identifier; and
      routing said call request to said recipient device using said private identifier.

2. The method of claim 1, further comprising:
   if said calling party identifier is excluded from said set of approved calling party identifiers:
      identifying a call handling treatment associated with said public identifier; and
      handling said call request in accordance with said call handling treatment.

3. The method of claim 2, wherein said call handling treatment is associated with a voice message service, and wherein said step of handling comprises:
   routing said call request to said voice message service.

4. The method of claim 2, wherein said call handling treatment is associated with a surrogate device, and wherein said step of handling comprises:
   routing said call request to said surrogate device.

5. The method of claim 1, wherein said step of selecting comprising:
   processing routing instructions associated with said public identifier using said calling party identifier as parametric input.

6. The method of claim 1, wherein said communication network comprises a voice-over-internet protocol (VOIP) network.

7. A method of managing call requests in a communication network, comprising:
   registering a public identifier associated with a recipient party with said communication network;
   registering a set of approved calling party identifiers associated with said public identifier;
   registering routing instructions for routing call requests from each approved calling party identifier in said set of approved calling party identifiers to at least one private identifier associated with a respective at least one recipient device; and processing, by said communication network operated by a service provider, call requests for said public identifier in accordance with said set of approved calling party identifiers and said routing instructions.

8. The method of claim 7, wherein said step of processing comprises, for each call request of said call requests:

comparing a calling party identifier associated with said call request with said set of approved calling party identifiers; and if said calling party identifier is included in said set of approved calling party identifiers:

processing said routing instructions using said calling party identifier as parametric input to select a private identifier of said at least one private identifier; and routing said call request to a recipient device of said at least one recipient device associated with said private identifier.

9. The method of claim 8, wherein said step of processing further comprises, for each call request of said call requests:

if said calling party identifier is excluded from said set of approved calling party identifiers:

identifying a call handling treatment associated with said public identifier; and handling said call request in accordance with said call handling treatment.

10. The method of claim 9, wherein said call handling treatment is associated with a voice message service, and wherein said step of handling comprises:

routing said call request to said voice message service.

11. The method of claim 9, wherein said call handling treatment is associated with a surrogate device, and wherein said step of handling comprises:

routing said call request to said surrogate device.

12. The method of claim 7, wherein said communication network comprises a voice-over-internet protocol (VOIP) network.

13. Apparatus for processing a call request in a communication network, comprising:

means for receiving, from an originating device, a call request for a public identifier associated with a recipient party;

means for identifying, by said communication network operated by a service provider, a set of approved calling party identifiers associated with said public identifier;

means for comparing a calling party identifier associated with said originating device with said set of approved calling party identifiers;

means for selecting a private identifier for a recipient device based on said calling party identifier; and means for routing said call request to said recipient device using said private identifier if said calling party identifier is included in said set of approved calling party identifiers.

14. The apparatus of claim 13, further comprising:

means for identifying a call handling treatment associated with said public identifier and handling said call request in accordance with said call handling treatment if said calling party identifier is excluded from said set of approved calling party identifiers.

15. The apparatus of claim 13, wherein said means for selecting comprising:

means for processing routing instructions associated with said public identifier using said calling party identifier as parametric input.

16. A communication network, comprising:

a database for storing a public identifier associated with a recipient party, a set of approved calling party identifiers associated with said public identifier, and routing instructions for routing call requests from each approved calling party identifier in said set of approved calling party identifiers to at least one private identifier associated with a respective at least one recipient device; and a controller for processing call requests for said public identifier in accordance with said set of approved calling party identifiers and said routing instructions, wherein said communication network is operated by a service provider.

17. The communication network of claim 16, wherein said controller is configured to, for each call request of said call requests:

compare a calling party identifier associated with said call request with said set of approved calling party identifiers; and if said calling party identifier is included in said set of approved calling party identifiers:

process said routing instructions using said calling party identifier as parametric input to select a private identifier of said at least one private identifier; and route said call request to a recipient device of said at least one recipient device associated with said private identifier.

18. The communication network of claim 17, wherein said controller is configured to, for each call request of said call requests:

if said calling party identifier is excluded from said set of approved calling party identifiers:

identify a call handling treatment associated with said public identifier; and handle said call request in accordance with said call handling treatment.

19. The communication network of claim 18, wherein said call handling treatment is associated with a voice message service, and wherein said controller is configured to handle said call request by routing said call request to said voice message service.

20. The communication network of claim 18, wherein said call handling treatment is associated with a surrogate device, and wherein said controller is configured to handle said call request by routing said call request to said surrogate device.

* * * * *